July 3, 1962  EIZABURO MURAKAMI  3,042,073
AUTOMATIC REGULATING VALVE
Filed Nov. 2, 1959  3 Sheets-Sheet 1

INVENTOR.
Eizaburo MURAKAMI
BY
Wenderoth, Lind & Ponack
Attys.

July 3, 1962
EIZABURO MURAKAMI
3,042,073
AUTOMATIC REGULATING VALVE
Filed Nov. 2, 1959
3 Sheets-Sheet 2
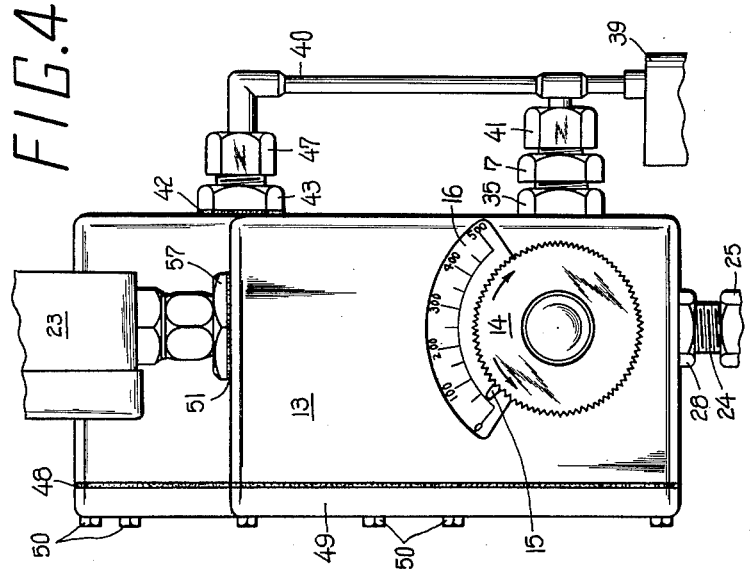
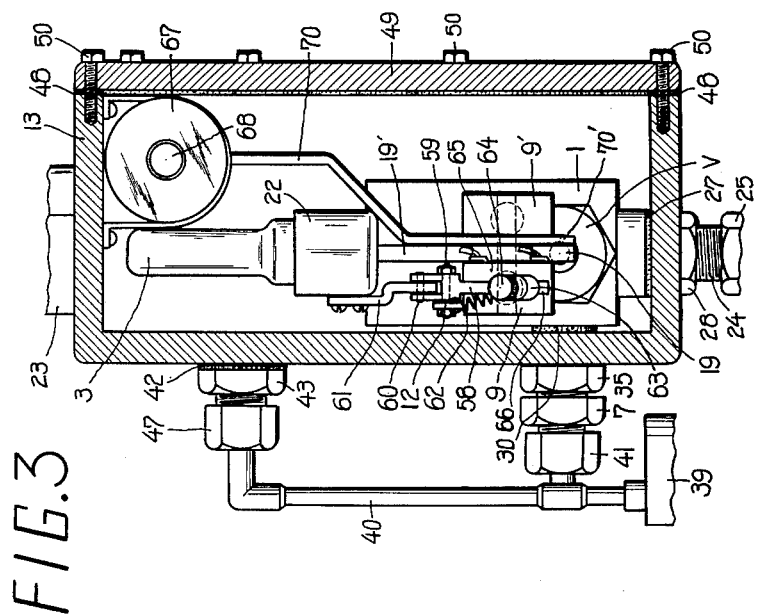
INVENTOR.
Eizaburo MURAKAMI
BY
Wenderoth, Lind & Ponack
Attys.

3,042,073
AUTOMATIC REGULATING VALVE
Eizaburo Murakami, 619-19 Osaki Honcho,
Shinagawa-ku, Tokyo, Japan
Filed Nov. 2, 1959, Ser. No. 850,147
Claims priority, application Japan Nov. 24, 1958
3 Claims. (Cl. 137—495)

This invention relates to a pressure responsive valve, especially for high-pressure use, which is actuated by fluid such as steam, air, oils, gases, etc.

This invention is so designed that a pressure apparatus is provided with a "Bourdon" tube and an exhaust valve, wherein, when the pressure of the fluid reaches the designated maximum limit, the valve body is caused to be operated by the operation of the "Bourdon" tube, thereby discharging the fluid from the exhaust valve, and, when said pressure is reduced to a certain pressure, the "Bourdon" tube is restored to its normal condition, thereby closing the exhaust valve.

The object of this invention is to make the opening and closing of an exhaust valve quick and accurate, thereby keeping the fluid chamber always under a certain pressure, and thus preventing the abnormal dropping of the pressure in the fluid chamber that arises from the inaccurate operation of an exhaust valve.

In the conventional regulating valves for high-pressure use, the action of preventing the vibration of the valve body at the time it is opened was limited only to the compression force of a spring engaged with the valve body, so that, when the spring is compressed continuously, its ability to close the valve becomes very weak, with the result that the fluid under pressure is discharged much more than required, thereby causing an abnormal dropping of the pressure in the fluid chamber. Therefore with such a valve it is difficult to maintain the fluid chamber constantly within the limit of a certain pressure desired, and, at the same time, there is a strong possibility of the fluid's leaking, and especially, when the regulating valve operating mechanism is in trouble, or damaged, etc., the leakage of the noxious fluid is excessive, and, therefore, very dangerous, and the like.

According to the present invention, the pressure of the fluid is not applied directly to the operating surface of the valve body when it is opened, but is transmitted only to the "Bourdon" tube, so that the valve body is always kept closed over an exhaust hole and is closed up accurately, and, when the "Bourdon" tube is operated due to the increase in pressure, the valve body is opened quickly and accurately by the strong pressing force of the "Bourdon" tube, thereby regulating the pressure of the fluid. At the same time, after said pressure has been so regulated as to fall down to a certain pressure, because the "Bourdon" tube is reset, the valve body is closed by a dual valve-closing action due to both the spring and the pressure of the fluid, and is thereby again reset and closed up quickly and accurately, so that it is possible to maintain the fluid chamber always correctly within the limit of a certain pressure desired without discharging the fluid under pressure much more than required. Further, because the opening and closing of the valve is very quick and accurate, there is almost no leakage of the fluid under pressure. The forward end of a lever which is to carry out the opening and closing operation of the regulating valve by the operation of the "Bourdon" tube is connected to an electromagnet, and, in turn, this electromagnet is caused to be operated by a microswitch which is to be opened and closed interlockingly with the operation of the "Bourdon" tube, so that it is possible to have both the quickness and accuracy of the opening and closing operation of the valve greatly improved, because the attractive force of the electromagnet is further applied thereto in addition to the action of the "Bourdon" tube itself.

This invention will become more apparent to those skilled in the art by reference to the drawings hereunto attached, wherein—

FIG. 3 is a sectional view taken at the line B—B of FIG. 1;

FIG. 4 is a side view of an apparatus of this invention; and

Figure 1:
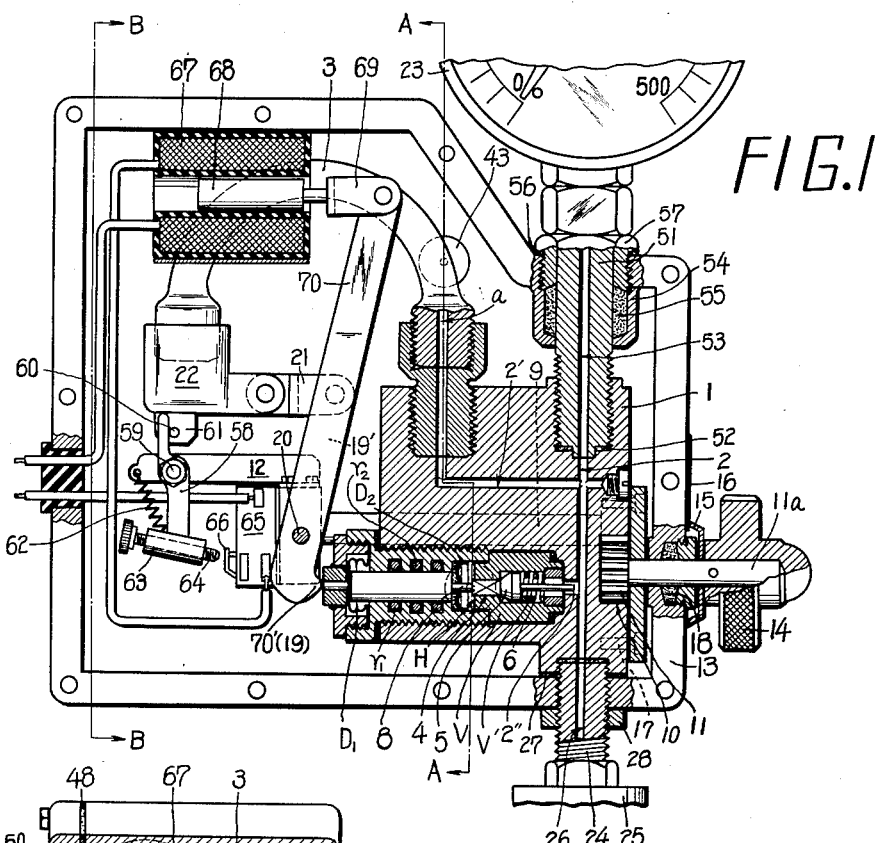
FIG. 1 is a longitudinal sectional front view of an apparatus of this invention.
Figure 2:
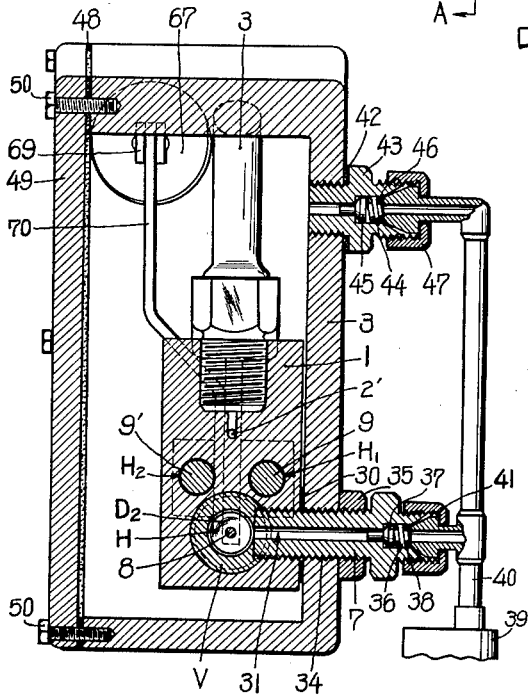
FIG. 2 is a sectional view taken at the line A—A of FIG. 1.
Figure 5:
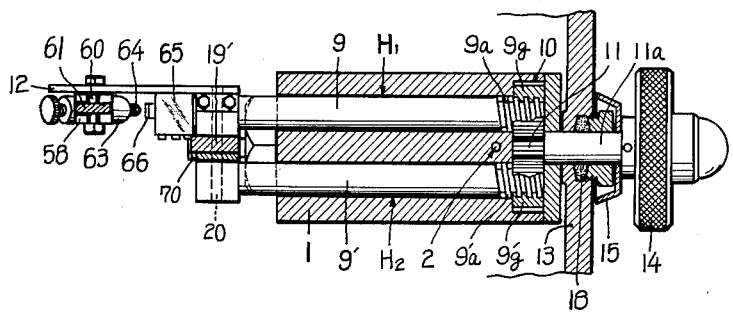
FIG. 5 is a cross sectional view of the pressure regulating mechanism.

In apparatus body 1, there are provided vents 2, 2' and 2" which are interconnected so as to open into each other, and the fixed end of "Bourdon" tube 3 is screwed in and tightly fixed to said apparatus body, said "Bourdon" tube 3 being a hollow flat tube curved in the circular arc shape which is lined with stainless steel and made of spring steel, brass, Phosphor bronze, etc., and vent 2' and hole "a" of the "Bourdon" tube are interconnected so as to open into each other. An exhaust hole 4 is provided in valve base V which is threaded with apparatus body 1, and, in valve chamber V' formed between said exhaust hole and vent 2", there is contained valve body 5 which is so provided as to open and close the end of exhaust hole 4, one end of said valve body being pressed by coil spring 6. In valve base V, there is made hole H which, when valve body 5 is opened, is interconnected into valve chamber V' at the left side of valve body 5, said hole H having exhaust tube connector 7 threaded into it and also having pressing rod 8 inserted therein, and the forward end of said pressing rod is positioned face to face with the forward end of valve body 5. Further, in order to prevent the fluid from leaking through the bore for pressing rod 8, this rod 8 is encircled with O-rings $r_1$, $r_2$ and $r_3$ and also it is covered with diaphragms $D_1$ and $D_2$ at both ends. 9 and 9' are rods which are fitted slidably into holes $H_1$ and $H_2$ provided at the left side of apparatus body 1, and, at the rear ends of said supporting levers, there are respectively cut male threads $9a$ and $9a'$, which male threads are engaged with female threads having gears $9g$ and $9g'$ cut on the outer surfaces thereof. Pinion 11 engaged with gears $9g$ and $9g'$ respectively is fitted into notch 10 provided at the left side of apparatus body 1, said pinion having axle $11a$ passing through a hermetically sealed case 13 to the outside thereof. Handle 14 and pointer 15 are tightly fixed to said axis $11a$, said pointer 15 being so positioned as to indicate scale 16 for pressure regulation which is provided on the outside of hermetically sealed case 13. At the point where axle $11a$ passes through, a tightening screw is threaded into hermetically sealed case 13 to compress packing 18.

At the left end part of rods 9 and 9', lever 70 is pivoted on pivot 20 to rods 9 and 9', and the upper end of said lever 70 is articulated to connecting lever 21 and cover 22 screwed onto the free end of the "Bourdon" tube. 23 is a "Bourdon" tube type pressure gauge fixed tightly to apparatus body 1, and it interconnects the "Bourdon" tube to the above-mentioned vent 2. A connection tube 24 is provided with bore 26 which interconnects pressure apparatus 25 and vent 2, said connection tube having its forward end threaded into apparatus body 1 and being fastened to hermetically sealed case 13 with nut 28 and having a packing 27. Exhaust tube connector 7 extends outwardly from hole 34 of hermetically sealed case 13 through packing 30 and is fastened thereto by nut 35, and at the open end of bore 31 of said exhaust tube connector, there is provided check valve chamber 36, in which check valve 37 is held by spring 38. One branch of tube 40 extending to blow-tank 39 is tightly connected to valve chamber 36 by cap nut 41. Connection tube 43 is threaded into hermetically sealed case 13 through a packing 42, and, at the outer end of said connection tube, there is provided check valve chamber 44, in which check valve 45 is held by spring 46. To said valve chamber is connected the other branch of tube 40 by cap nut 47. The opening side of hermetically sealed case 13 is covered and hermetically closed by cover 49 and a packing 48, said cover 49 being tightly fastened by bolts 50 so as to keep air out of said hermetically sealed case 13. "Bourdon" tube type pressure gauge 23 is fixed to the upper end of supporting tube 51 on the outside of hermetically sealed case 13, said supporting tube having its lower end threaded into apparatus body 1 through packing 52 so as to interconnect hole 53 to vent 2. The intermediate part of the supporting tube is positioned in recess 54 which is formed on hermetically sealed case 13 and is surrounded by packings 55 and 56 held in position by packing nut 57. A switch actuating lever 58 is pivoted on pivot 59 on a slide 12 which is tightly fixed to rods 9, the left end of said slide 12 and the lower end of said lever 58 being connected by spring 62 so as to have the upper end of said lever 58 always contacting pin 60 provided on arm 61 fastened to cover 22 on the end of the "Bourdon" tube, and, at the lower end of lever 58, there is provided female threaded bushing 63, into which contact member 64 is threaded so as to have its forward end positioned face to face with resilient contact 66 of microswitch 65. Microswitch 65 is tightly fixed to the left end of rods 9. Electromagnet 67 is fixed to the upper part of hermetically sealed case 13, and it is connected to a source of electricity through the above-mentioned microswitch 65. Lever 70 has the upper end thereof pivoted to connecting lever 69 which is tightly fixed to movable iron core 68 of said electromagnet 67. Lever 70 is also pivoted at 20 to the slide 12 so as to have its lower end 70' opposed to the end of rod 8.

In operation, handle 14 is turned to the left so as to set pointer 15 at the appropriate graduation, for instance, 200 kg./cm.$^2$, of scale 16, rotating pinion 11 and gears $9g$ and $9g'$, said gears $9g$ and $9g'$ being rotated to the right to move male threads $9a$ and $9a'$ to the right and setting the position of rods 9. Now, if the inside of pressure apparatus 25 reaches the limit of pressure, then, "Bourdon" tube 3, because it is constantly filled with the fluid under pressure, gradually expands outward from its original curved shape, causing lever 70 to rotate in the counterclockwise direction around pivot 20 under the effect of connection lever 21, and, when the pressure has reached the maximum, the lower end 70' slides rod 8 against the resistance of coil spring 6, allowing valve body 5 to be opened, thereby letting the fluid under pressure go out through tube 40 to blow-tank 39 through interconnecting hole 31 and check valve 37. During this time lever 58 moves in the counterclockwise direction around on fixed pivot 59 due to the operation of "Bourdon" tube 3, causing the forward end of contact member 64 to press resilient contact piece 66 of microswitch 65 so as to close the circuit to electromagnet 67. The electromagnet 67 operates and draws connecting lever 69 to the left, the upper end of lever 70 moves to the left and, the lower end presses rod 8. Thus the force of said lever 70 against rod 8 is increased over and above the direct rotating force due to the "Bourdon" tube 3, thereby making it more quick and accurate in opening open valve body 5. Next, when the pressure inside of the pressure apparatus decreases to a certain pressure, then, because "Bourdon" tube 3 is rapidly restored to its original curved shape, lever 58 is reset to open resilient contact piece 66 of microswitch 65, thereby causing electromagnet 67 to be reset, and, at the same time, lever 70 is reset and the lower end moves away from rod 8, with the result that valve body 5 is rapidly restored to its normal condition due to both coil spring 6 and the back pressure of the fluid, thereby closing exhaust hole 4 accurately. It is possible to carry out the desired microadjustment of pressure by changing the position of both the indicated graduation of scale 16 and the working point of lever 70 according to the regulated pressure inside of the pressure apparatus.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A pressure responsive valve means, comprising a valve having a slidable valve member and a valve seat against which said valve member seats, an adjusting slide slidable relative to said valve seat, a lever pivoted on said adjusting slide and having one end bearing on said valve member for sliding said valve member, a Bourdon tube having one end fixedly mounted relative to said valve and having the interior thereof connected to said valve for being acted on by the pressure on one side of said valve, the other end of said tube being pivotally linked with said lever on the opposite side of said pivotal mounting of said lever from the end bearing on said valve member, and quick acting means coupled between the other end of said Bourdon tube and the other end of said lever, whereby when said Bourdon tube changes shape in response to a change in pressure to which it is exposed, said valve member is moved in relation to said valve seat.

2. A pressure responsive valve means as claimed in claim 1 in which said quick acting means are electromagnetic means and comprise a solenoid having a slidable member slidable therein, said slidable member being connected to said valve actuating lever.

3. A pressure responsive valve means as claimed in claim 2 in which said electromagnetic means further comprise switch means connected to said electromagnetic means for energizing said electromagnetic means, and switch actuating means comprising a pivoted switch closing lever having one end in contact with the other end of said Bourdon tube and having the other end positioned for engagement with said switch means, and a spring biasing said switch actuating lever toward engagement with said Bourdon tube, and said switch closing lever being pivoted on said slide, and said spring being connected between said switch closing lever and said slide.

References Cited in the file of this patent

UNITED STATES PATENTS

| | | |
|---|---|---|
| 607,491 | Swenson | July 19, 1898 |
| 1,453,291 | Staley | May 1, 1923 |
| 2,015,967 | Ryder | Oct. 1, 1935 |
| 2,747,640 | Kress | May 29, 1956 |